JOHN McNICHOL.

Improvement in Foot-Measures for Shoemakers.

No. 115,761.  Patented June 6, 1871.

Witnesses.

Inventor.

UNITED STATES PATENT OFFICE.

JOHN McNICHOL, OF PONTIAC, ILLINOIS.

IMPROVEMENT IN FOOT-MEASURES FOR SHOEMAKERS.

Specification forming part of Letters Patent No. 115,761, dated June 6, 1871.

*To all whom it may concern:*

Be it known that I, JOHN McNICHOL, of Pontiac, in the county of Livingston and State of Illinois, have invented a new and valuable Improvement in Measures for Shoemakers' Use; and I do hereby declare that the following is a full, clear, and exact description of the construction and operation of the same, reference being had to the annexed drawing making a part of this specification, and to the letters and figures of reference marked thereon.

Figure 1:
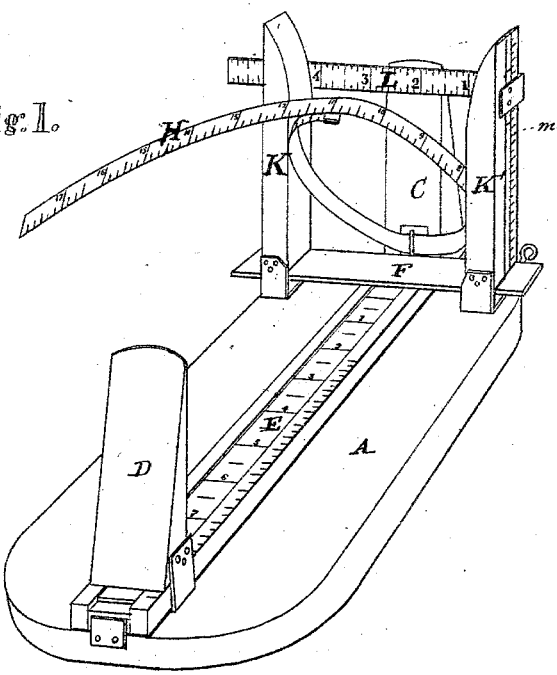
Figure 2:
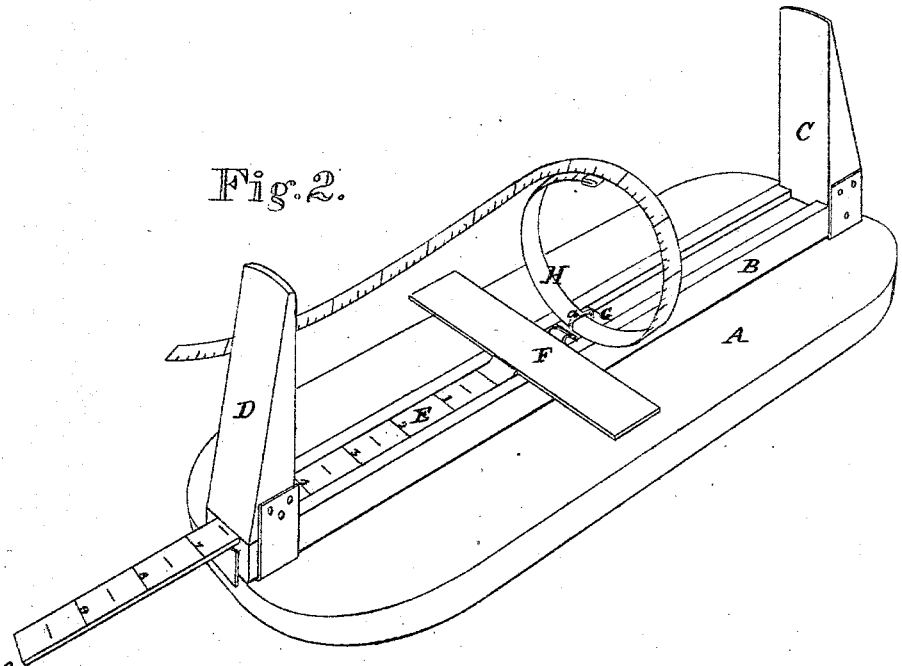

Figure 1 of the drawing is a perspective view of my invention with the counter-measure attached. Fig. 2 is a perspective view of the same without the counter-measure, as adapted to measuring the instep.

My invention relates to means for taking the measurement of the feet, and consists, mainly, in the construction and novel arrangement of devices designed to enable the shoemaker to take all the necessary measurements with facility and quickness.

The letter A of the drawing designates a platform, to which the measuring-bar B is attached by a hinge at one end. When the measuring-bar is thrown back this platform may be used for marking out the general shape of the foot. B represents the measuring-bar, to one end of which is secured the upright rest C, against which the heel is placed in the ordinary manner. D is the sliding upright, adjusted to the front end of the foot, and serving to show the length thereof, upon a scale marked on the bar B. Sliding in a shallow channel formed in the upper surface of the bar B is a thin slide or strip of metal, E, graduated, and provided with a cross-bar, F, at one end. Hinged to this cross-bar, on the opposite side from the graduated slip E, is a small plate, G, provided with a loop, *a*, through which passes a measuring-tape, H. K K′ represents sliding uprights, provided with slots at their lower ends, through which the ends of the cross-bar F pass. Attached to the upper end of one of these uprights in a slip of metal, L, which extends horizontally across to the other upright K, and serves to show the breadth of the heel, by means of the scale thereon marked. This scale L has also a vertical movement in a slot in the outer side of the upright K′, to which it is attached, in order that the height of the counter may be known from the scale upon the upright.

My device is thus operated: The foot having been placed centrally on the bar B, with the heel against the stationary upright C and in contact with the scale L, the slide D is adjusted to the toe, and the length of the foot noted from the bar B. The width of the heel is next taken from the scale L, and the height of the counter from the scale on the upright K′. The measurement from the heel over the instep is then noted from the tape H. The uprights K K′ having now been removed, the scale E is drawn forward, and the necessary measurements taken around the foot in front of the ankle. These measurements are taken at suitable distances from the toe, regulated according to the scale E, and are made by means of the tape H.

What I claim as my invention, and desire to secure by Letters Patent, is—

The foot-measure herein described, consisting of the platform A, hinged graduated bar B, brackets C D, and graduated slide E, having cross-piece F, tape H, and removable uprights K K′, with adjustable transverse scale L, when constructed and arranged to operate substantially as shown and described.

In testimony that I claim the above I have hereunto subscribed my name in the presence of two witnesses.

JOHN McNICHOL.

Witnesses:
JOSEPH F. CULNER,
W. B. FYFE.